United States Patent [19]
Kennedy, Jr. et al.

[11] Patent Number: 5,382,954
[45] Date of Patent: Jan. 17, 1995

[54] RESOLUTION ADVISORY DISPLAY INSTRUMENT FOR TCAS GUIDANCE

[75] Inventors: Thomas W. Kennedy, Jr., Phoenix; Donald F. Fenstermaker, Glendale, both of Ariz.

[73] Assignee: Honeywell Inc., Minneapolis, Minn.

[21] Appl. No.: 68,337

[22] Filed: May 27, 1993

[51] Int. Cl.$^6$ .............................................. G08G 5/04
[52] U.S. Cl. ................................. 340/961; 342/29; 364/461
[58] Field of Search .................. 340/961, 973, 975; 342/29; 364/461

[56] References Cited

U.S. PATENT DOCUMENTS

| | | |
|---|---|---|
| 3,614,728 | 10/1971 | Borrok et al. . |
| 3,691,520 | 9/1972 | Nordström . |
| 4,860,007 | 8/1989 | Konicke et al. ............... 340/977 |
| 4,980,683 | 12/1990 | O'Sullivan et al. ............ 340/961 |
| 5,185,606 | 2/1993 | Verbaarschot et al. ......... 340/975 |
| 5,248,968 | 9/1993 | Kelly et al. .................. 340/961 |

*Primary Examiner*—Brent Swarthout
*Attorney, Agent, or Firm*—A. L. Albin; D. E. Jepsen; R. E. Champion

[57] ABSTRACT

An aircraft indicating system for displaying a resolution advisory signal from a Traffic Advisory and Collision Avoidance System provides an indicating pitch attitude symbol to the pilot engendering an instinctive response to avoid a collision. A driving circuit converts a TCAS signal in the form of a vertical speed command to a pitch command for energizing the indicating symbol by effecting a vertical displacement thereof in accordance with the guidance resolution advisory. The display signal is generated in accordance with the relationship:

$$\Theta_{CMD} = \Theta_{EXIST} + \frac{SIN^{-1}[K(V_{ZTCAS} - V_{ZEXIST})/V_T]}{COS\Phi}\bigg|_{+/-30°MAX}$$

where:
 $\Phi$ = aircraft roll attitude, limited to + or −30°
 $\Theta_{CMD}$ = commanded pitch attitude defining the upper and lower pitch limits of the resolution advisory symbology
 $\Theta_{EXIST}$ = current pitch angle
 $V_{ZTCAS}$ = TCAS vertical speed command
 $V_{ZEXIST}$ = current vertical speed
 $V_T$ = true airspeed
 K = conversion constant.

11 Claims, 3 Drawing Sheets

RESOLUTION ADVISORY DISPLAY INSTRUMENT FOR TCAS GUIDANCE

BACKGROUND OF THE INVENTION

1. Field of The Invention

The invention relates to indicating instruments, and more particularly to a primary flight director instrument having a pitch cue responsive to resolution advisory guidance commands for collision avoidance.

2. Description of The Prior Art

The Traffic Advisory and Collision Avoidance System (TCAS) uses a Mode S Transponder with which civilian and military aircraft are equipped to communicate collision avoidance decisions between aircraft. One form of TCAS, known as TCAS II, is intended for large commercial and general aviation aircraft. Aircraft in proximity are tracked in both the horizontal and vertical planes, from which the time of closest approach may be predicted. However, the lack of adequate bearing measurement accuracy precludes support of horizontal maneuvers. The pilot of the own aircraft is advised on how to avoid a collision with respect to advisories to climb, descend, do not climb, or do not descend, and may also be advised as to a required vertical speed rate to avoid a collision. If the threat aircraft is also equipped with a TCAS system, the avoidance maneuver will be communicated and coordinated with the threat aircraft accordingly, so that both aircraft do not select the same avoidance maneuver.

Threat detection is performed at two levels. When air traffic approaches within a predetermined protective volume a traffic advisory is provided to alert the pilot to attempt a visual sighting and take whatever corrective action he deems appropriate to increase separation between the aircraft. If the two aircraft continue to approach, typically such that within a minimum time of 20 seconds they will be within 0.1 nautical mile (n) of each other and with an altitude difference not greater than 750 ft, a resolution advisory will be issued, displaying a maneuver to the pilot to increase separation of the aircraft. The advisories may be accompanied by limits to the rate of climb or descent.

Prior art resolution advisory displays have been in the form of a mechanical instrument or electronic display providing a pointer on an altitude rate scale and an arrow or colored scale for displaying change in altitude advisories. See, for example, U.S. Pat. No. 4,914,733 and U.S. Pat. No. 3,621,210. However, such displays have heretofor not provided command information for changes in pitch attitude necessary to satisfy the resolution advisory.

Aircraft primary flight director instruments are well known for use in providing visual commands to the pilot. Thrust, pitch attitude, and bank attitude controls are exercised by the human pilot while observing the flight director display. When the pilot manipulates the aircraft controls in a manner to keep the steering cues aligned with corresponding fixed reference symbols, he will satisfy the pitch and roll attitude control law so that the aircraft is maintained on a predetermined flight path.

Such flight director steering cues have in general been provided in two forms—steering bars, adapted for movement up or down to command corresponding changes in pitch and for movement left or right to command bank angle changes, and aircraft symbols, representative of the attitude of the aircraft, which move up and down to command pitch changes and roll left or right to command bank angle changes.

The present invention provides an indicator for a primary flight director instrument display which is provided with a single cue provided in pitch to provide visual commands for bringing the craft to a pitch attitude commensurate with the resolution advisory vertical velocity signal. It overcomes the disadvantage of purely performance cues such as vertical velocity, in which the performance cue display may lag the current vertical speed.

A single cue provides both a pitch change command and indicates a guarded region to be avoided. A further cue provides the current vertical speed in a numerical display as well as bands indicating a target vertical velocity and a proscribed vertical velocity range. The instrument further provides the capability of indicating pitch commands in the presence of two threat aircraft.

SUMMARY OF THE INVENTION

In accordance with the present invention an aircraft indicating system for displaying a resolution advisory signal for avoiding a collision between first and second aircraft comprises means for receiving a TCAS resolution advisory signal in the form of a vertical speed command for determining the evasive action to be taken by the pilot of the first aircraft to avoid collision with the second aircraft, means for receiving signals corresponding to the aircraft roll angle and current pitch angle, means for receiving signals corresponding to the current vertical speed and true airspeed, means for applying the TCAS signal, current vertical speed signal, and the true airspeed signal to generate a signal corresponding to a first trigonometric function, means for deriving a second trigonometric function representative of aircraft roll angle and for generating a corresponding signal thereof, means for combining the first and second trigonometric function signals to derive a further signal representative of a desired change in aircraft pitch angle, means for combining the current pitch angle signal and the desired change in pitch angle signal to provide a signal corresponding to a commanded pitch angle for avoiding a collision, and means for applying the commanded pitch angle signal to a display for providing a symbolic representation thereof.

In a preferred embodiment the invention comprises an aircraft indicating system of the integrated primary flight display type, the indicator defining a display field of view having a vertical axis, an index in the form of an aircraft symbol relatively fixed with respect to the display field of view and generally disposed in the center of the field, a horizon-defining reference line responsive to the roll and pitch attitude of the aircraft for correspondingly positioning the horizon line relative to the index, a first plurality of reference symbols circumferentially disposed with respect to the vertical axis and indicative of roll attitude of the aircraft when one of the reference symbols is aligned with the horizon line, and a second plurality of reference symbols substantially orthogonally disposed with respect to the horizon line and indicative of the pitch attitude of the aircraft, wherein the symbolic representation comprises a least first and second indicia superposed on the field of view and assuming priority over any underlying indicia, the first indicia indicative of a target pitch command to climb or descend and the second indicia indicative of a proscribed pitch maneuver region in accordance with a given guidance resolution advisory, the first and second indicia responsive to the commanded pitch angle signal to effect vertical displacement of the indicia for command purposes, the first indicia comprised of a horizontal band of a first predetermined color, the band disposed with respect to the vertical axis in accordance with the commanded pitch angle signal and having a vertical depth corresponding to a target range of acceptable pitch deviation in accordance with the upper and lower bounds of the given resolution advisory, the second indicia comprised of a pair of angularly disposed display lines of a second predetermined color and terminating at respective ends of the horizontal band, the first and second indicia defining an open-ended relatively trapezoidal symbol, the open end having a horizontal dimension exceeding the longitudinal dimension of the closed end defined by the horizontal bar, the open end downwardly disposed in response to a resolution advisory command to climb and upwardly disposed in response to a resolution advisory command to descend.

The invention will be described more fully by way of example, with reference to the accompanying drawings.

DESCRIPTION OF THE PREFERRED EMBODIMENTS

The present invention may be described in terms of a collision avoidance indicator in combination with aircraft vertical speed indication. It is particularly adapted to flight instruments of the electronics integrated display type, which may utilize a CRT in raster or stroke scanning mode, or a combination thereof, or other displays such as an active matrix type. Such an indicator system is described, for example, in U.S. Pat. No. 4,149,148 assigned to the assignee of the present invention. The means for generating such displays are well known to those skilled in the art.

Figure 1:
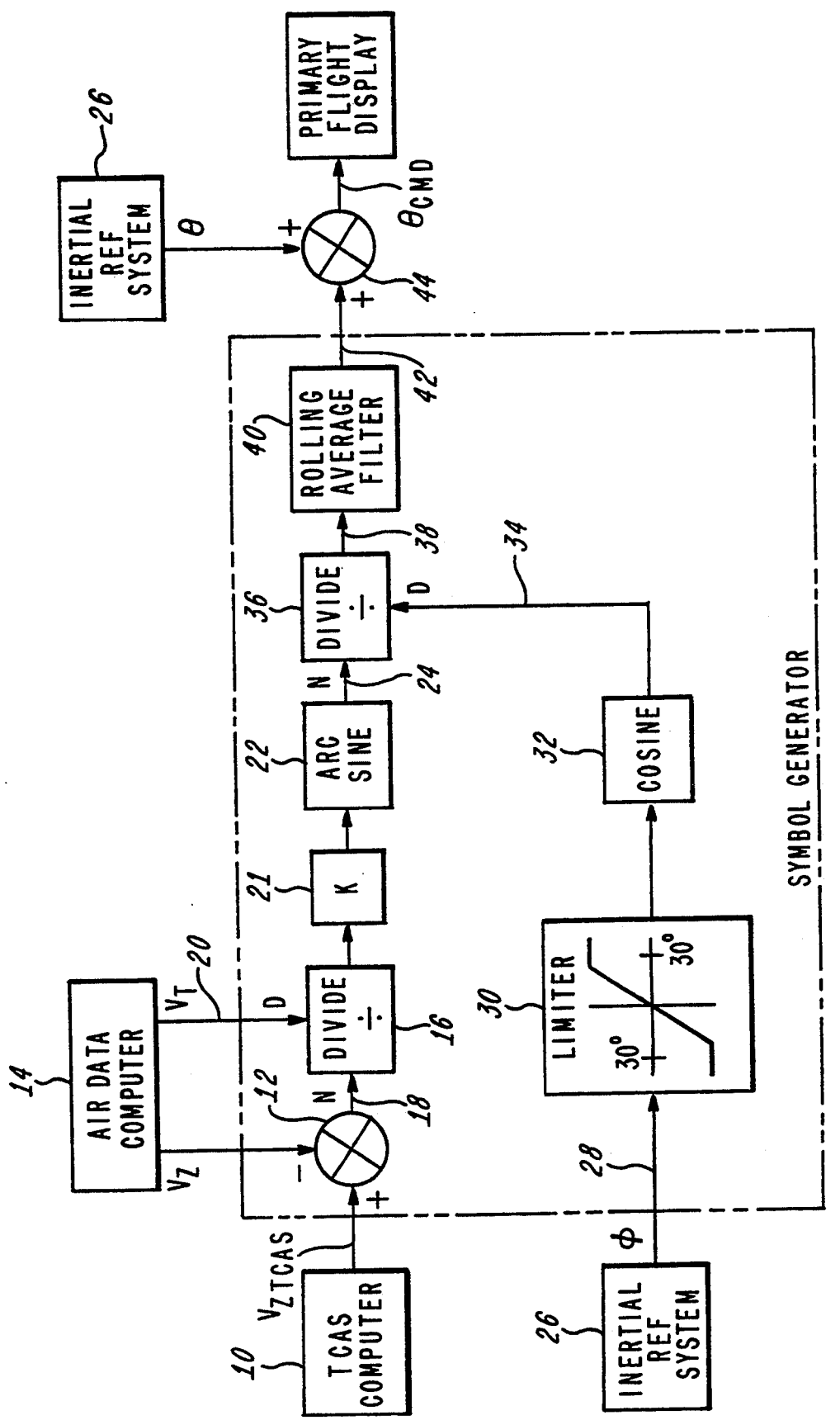
FIG. 1 is a functional block diagram of the means for generating the displays of FIGS. 2-3.

Referring to FIG. 1, a command signal $V_{ZTCAS}$ is provided by a collision avoidance computer 10 in the form of a vertical speed command. The present invention converts the TCAS vertical speed command into a pitch command for display in a unique symbol on a primary flight display instrument. The details of the computer are not described herein, there being numerous configurations known to the state of the art for formulating collision avoidance command signals as aircraft climb or descent rates. The present invention combines the vertical speed command with a pitch attitude indicator to provide a display which conveys an instinctive pitch attitude command to the pilot while minimizing the need for pilot interpretation and minimizing reaction time.

The vertical speed command signal 10 is applied to an input of summing junction 12. A conventional air data computer 14 provides a signal $V_Z$ corresponding to the current vertical speed to summing junction 12, where signals $V_{ZTCAS}$ and $V_Z$ are algebraically combined in a subtractive manner, the difference being applied to a first divider 16. Air data computer also supplies a signal corresponding to true airspeed to divider 16. The quotient of the difference signal on lead 18 divided by the true airspeed signal on lead 20 is applied to a gain block 21, which applies a multiplier factor K to the divider output to convert the airspeed difference from ft/min to knots. The output of gain block K is applied to trigonometric function block 22, which outputs a signal on lead 24 representative of an angle corresponding to the signal output of divider 16.

A conventional on-board inertial reference system 26 providing pitch attitude and roll attitude signals provides a signal $\Phi$ which is a measure of the roll attitude of the aircraft. The signal $\Phi$ on lead 28 is coupled to a limiter 30, which limits the output to a maximum of plus or minus 30 degrees. The limited output is applied to a further trigometric function block 32, which outputs a signal on lead 34 corresponding to the cosine of the output signal from limiter 30.

A further divider 36 provides the quotient of the numerical angle signal on lead 24 and the cosine signal on lead 34 as an output on lead 38 to a rolling average filter 40. Filter 40 is synchronized with the primary flight display indicator (not shown) to sample the output of divider 36 at each display frame. From four to six such samples are averaged and provide a signal representative of a desired change in pitch attitude free of disturbances from atmosphere turbulence. At each successive display frame a new average is computed, with the earliest sample being discarded and the newest sample computed in the average, to provide a "rolling" output signal on lead 42 to further summing junction 44. Typically, the update rate will be 200 ms for each successive display frame.

A signal $\Theta$ representing the current pitch attitude of the aircraft and derived from the inertial reference system 26 is algebraically summed with the signal from filter 42 to generate a pitch command signal $\Theta_{CMD}$, which activates unique pitch command symbology in the primary flight display indicator in a manner to be described.

The present invention may be implemented using conventional analog circuitry and computational techniques or by using conventional wholly digital techniques or by using conventional hybrid digital/analog techniques. To simplify the understanding of the invention, it has been explained by using a generally analog format as shown in FIG. 1, it being understood that the same analog format may also represent, in block diagram form, the program of a programmable digital computer wherein the various analog inputs are converted to digital signals for digital processing and the various outputs are converted to analog signals for driving the primary flight display instrument.

The control law for generating a pitch display as described may be defined by the following relationship:

$$\Theta_{CMD} = \Theta_{EXIST} + \frac{\text{SIN}^{-1}[K(V_{ZTCAS} - V_{ZEXIST})/V_T]}{\text{COS}\Phi|_{+/-30^\circ MAX}}$$

where:
$\Phi$ = aircraft roll attitude, limited to + or −30°, in degrees $\Theta_{CMD}$ = commanded pitch attitude defining the upper and lower pitch limits of the resolution advisory symbology, in degrees $\Theta_{EXIST}$ = current pitch angle, in degrees $V_{ZTCAS}$ = TCAS vertical speed command, in ft/min $V_{ZEXIST}$ = current vertical speed, in ft/min $V_T$ = true airspeed, in knots K = conversion constant Referring now to FIG. 2 as well as FIG. 3 in which like reference numerals indicate like components, the flight director display instrument 50 includes an attitude directional indicator 52 having an index 54 in the form of an aircraft symbol which is relatively fixed with respect to the display field of view while the horizon reference line 56 is responsive to the roll attitude of the aircraft. Thus, in the example of FIG. 2, the horizon reference line 56 is angularly displaced by 20° in roll. A plurality of reference marks 58 are displaced on the circumference of the indicator 52 which indicate the roll attitude of the aircraft when aligned with one of the reference marks 58. Note that the aircraft symbol 54 remains stationary while the horizon line 56 moves with roll of the aircraft. In a conventional manner, the display includes an airspeed tape 60, an altitude tape 62, a horizontal indicator 64, and a normalized angle of attack scale 66.

The attitude directional indicator further includes a second plurality of reference symbols 68 which are substantially orthogonally disposed with respect to the horizon line 56, and are indicative of the pitch attitude of the aircraft. As can be most readily appreciated from FIG. 2, the aircraft symbol 54 denotes a pitch attitude of about 5 degrees above the horizon, the reference marks 68 being indicative of 5 degree increments and being numerically calibrated at 10 degree intervals. The aircraft instrument panel includes a mode selector switch (not shown) for engaging selected flight modes during which the indicator 50 would be adapted to the mode being utilized. Thus, in the resolution advisory mode an alphanumeric display 68 "RA ONLY" indicates to the pilot that the attitude situation indicator 58 will provide pitch command symbology assuming priority over any underlying indicia.

Figure 2:
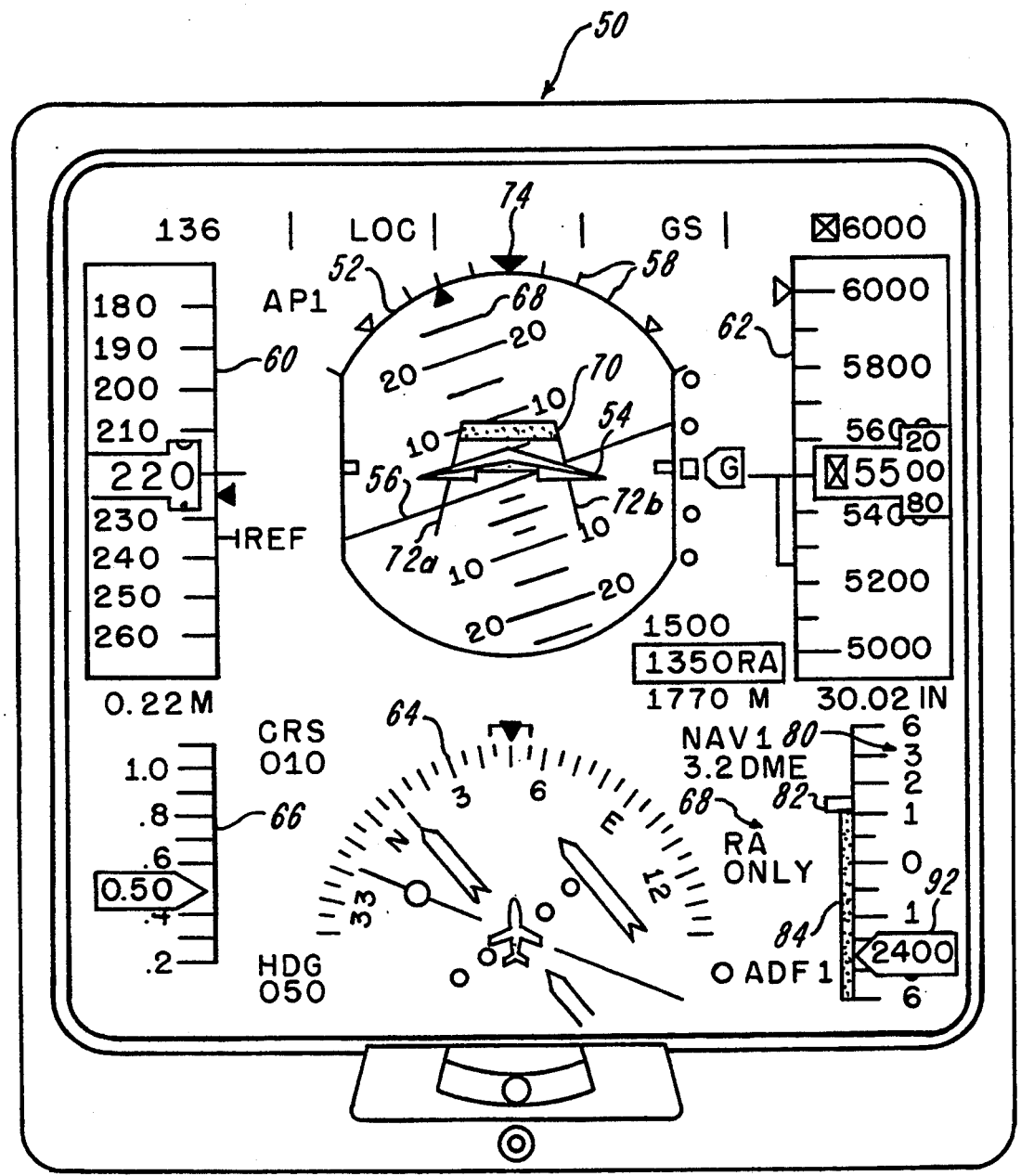
FIG. 2 is a front elevation view of the primary flight display instrument of the present invention, showing the novel pitch command indicia as responsive to an up resolution advisory.

The indicator 50 in resolution advisory mode includes first and second indicia (70,72) superposed on the field of view. The indicia 70 comprises a horizontal band of a predetermined color, typically green, disposed with respect to the vertical axis denoted by reference mark 74 in accordance with the pitch angle signal $\Phi_{CMD}$ derived from the resolution advisory command. It is defined by a pair of upper and lower horizontal lines having a vertical depth corresponding to a target range of acceptable pitch deviation in accordance with the upper and lower bounds of the resolution advisory command. The indicia 72 comprises a pair of angularly disposed display lines 72a, 72b of a second predetermined color, preferably red, and terminating at respective ends of the first indicia 70 so as to form a symbol in the form of an open-ended trapezoid. In FIG. 2 the open ends are downwardly disposed, and indicate a command to climb to the pitch attitude displayed by horizontal bar 70. The upwardly facing horizontal green bar 70 is representative of the direction that the pilot is commanded to move the controls so as to align the bar 70 with the aircraft symbol 54. If a resolution advisory command directs a descent, then the angular lines will be disposed with the open ends above the horizontal bar.

There is further provided a vertical speed advisory tape and scale 80 which directly displays the resolution advisory vertical speed command corresponding to the desired pitch command. A green target band 82 indicates a commanded vertical speed corresponding to the pitch bar 70. A red target band 84 indicates a proscribed vertical speed range corresponding to the red guarded pitch band denoted by lines 72a and 72b. Typical input parameters for the PFD display on FIG. 2 are as follows:

| | |
|---|---|
| Indicated airspeed | 220 knots |
| Altitude | 5500 feet MSL |
| Roll attitude | 20 degrees right bank |
| Vertical velocity-TCAS | 1000–1500 ft/min green target band |
| Vertical velocity-existing | 2400 ft/min descent |
| Pitch attitude-existing | 5 degrees up |
| Pitch attitude-TCAS command | 7 degrees up |

Figure 3:
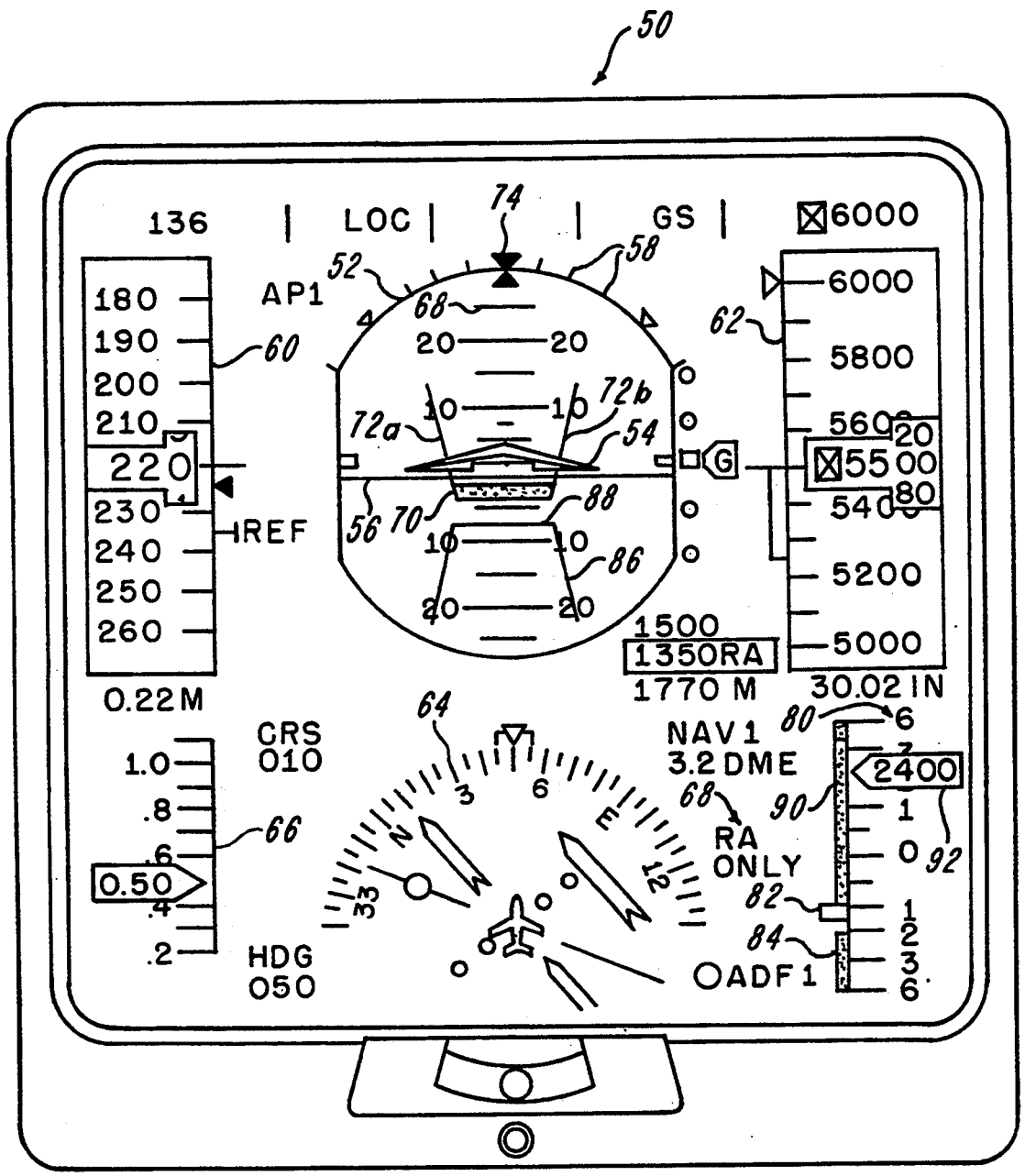
FIG. 3 is a front elevation view of the primary flight display instrument of the present invention, showing the pitch command indicia for a down advisory in the presence of two threat aircraft.

Referring now to FIG. 3, there is shown a condition in which the resolution advisory provides a warning of the presence of two threat aircraft. This is indicated by presenting a third indicia 86 symmetrically disposed with respect to the vertical axis and oppositely disposed with respect to the symbol defined by the first and second indicia 70, 72a, 72b. Note that only one green target bar 70 is presented, the third indicia being completed with a line 88. In the situation indicated, the aircraft is at a zero bank attitude and pitched 5 degrees above the horizon line 56. A down advisory for a first threat aircraft is indicated by the green target bar 70 being located below the horizon line. Indicia 86 being downwardly pointed with respect to the base of its trapezoidal infiguration indicates the response to the resolution advisory with respect to a second threat aircraft, and would preferably also be displayed as red lines to alert the pilot to the minimum safe pitch to avoid collision with the second aircraft.

Vertical speed tape 80 here displays the green target vertical speed rate 82 and is bordered by a red band 90 and a further red band 84, the red bands 84, 90 denoting the proscribed vertical speed rates to avoid collision with the threat aircraft, while the green band 82 denotes the commanded vertical speed rate from the TCAS computer. It will be appreciated that the pilot should avoid climbing at a rate such that the tape numerical readout 92 remains or enters into the red zones.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An aircraft indicating system for displaying a resolution advisory signal for avoiding a collision between first and second aircraft, comprising:
   means for receiving a TCAS resolution advisory signal in the form of a vertical speed command for determining the evasive action to be taken by the pilot of the first aircraft to avoid collision with the second aircraft,
   means for receiving signals corresponding to the aircraft roll angle and current pitch angle,
   means for receiving signals corresponding to the current vertical speed and true airspeed, means for applying said TCAS signal, said current vertical speed signal, and said true airspeed signal to generate a signal corresponding to a first trigonometric function, means for deriving a second trigonometric function representative of aircraft roll angle and for generating a corresponding signal thereof, means for combining said first and second trigonometric function signals to derive a further signal representative of a desired change in aircraft pitch angle, means for combining said current pitch angle signal and said desired change in pitch angle signal to provide a signal corresponding to a commanded pitch angle for avoiding said collision, and means for applying said commanded pitch angle signal to electronic display means for providing a symbolic representation thereof.

2. An aircraft indicating system as set forth in claim 1, further comprising:

first summing junction means responsive to said TCAS signal and said current vertical speed signal for providing an algebraic difference signal thereof, first divisor means responsive to said algebraic difference signal and said true airspeed signal for providing a first quotient signal by dividing said algebraic difference signal by said true airspeed signal, said first trigonometric function adapted for providing a signal proportional to the angle corresponding to the inverse trigonometric sine of said first quotient signal, said second trigonometric function adapted for providing a signal proportional to the trigonometric cosine of said roll angle signal, second divisor means responsive to said first and second trigonometric functions for providing a second quotient signal by dividing a signal corresponding to said first trigonometric function by a signal corresponding to said second trigonometric function, and second summing junction means for providing an algebraic sum of said second quotient signal and said pitch angle signal, said algebraic sum defining said commanded pitch angle signal.

3. A system as set forth in claim 2, further comprising roll angle limiting means, disposed between a source of said roll angle signal and said means for deriving a second trigonometric function, for limiting said roll angle signal between first and second predetermined limits.

4. A system as set forth in claim 3, wherein said first and second predetermined limits correspond to plus or minus 30 degrees.

5. A system as set forth in claim 4, wherein said desired change in pitch angle signal is applied to a rolling average filter and outputs thereof are comprised of a plurality of successive pitch angle signals sequentially averaged over a predetermined number of display frames, successive outputs of said filter being periodically updated at each display frame, thereby to preclude transient disturbances due to air turbulence.

6. A system as set forth in claim 5, wherein said plurality of successive pitch angle signals are averaged over at least four display frames.

7. A system as set forth in claim 2, wherein said symbolic representation is defined by the relationship:

$$\Theta_{CMD} = \Theta_{EXIST} + \frac{SIN^{-1}[K(V_{ZTCAS} - V_{ZEXIST})/V_T]}{COS\Phi}\Big|_{+/-30° MAX}$$

where:
$\Phi$ = aircraft roll attitude, limited to + or −30°, in degrees
$\Phi_{CMD}$ = commanded pitch attitude defining the upper and lower pitch limits of the resolution advisory symbology, in degrees
$\Phi_{EXIST}$ = current pitch angle, in degrees
$V_{ZTCAS}$ = TCAS vertical speed command, in ft/min
$V_{ZEXIST}$ = current vertical speed, in ft/min
$V_T$ = true airspeed, in knots
K = conversion constant 8. A system as set forth in claim 7, wherein said display means comprises an aircraft display instrument of the integrated primary flight display type, said display means defining a display field of view having a vertical axis, an index in the form of an aircraft symbol relatively fixed with respect to said display field of view and generally disposed in the center of said field, a horizon defining reference line responsive to the roll and pitch attitude of said aircraft for correspondingly positioning said horizon line relative to said index, a first plurality of reference symbols circumferentially disposed with respect to said vertical axis and indicative of roll attitude of said aircraft when one of said reference symbols is aligned with said horizon line, and a second plurality of reference symbols substantially orthogonally disposed with respect to said horizon line and indicative of the pitch attitude of the aircraft, wherein said symbolic representation comprises at least first and second indicia superposed on said field of view and assuming priority over any underlying indicia, said first indicia indicative of a target pitch command to climb or descend and said second indicia indicative of a proscribed pitch maneuver region in accordance with a given guidance resolution advisory, said first and second indicia responsive to said commanded pitch angle signal to effect vertical displacement of said indicia for command purposes, said first indica comprised of a horizontal band of a first predetermined color, said band disposed with respect to said vertical axis in accordance with said commanded pitch angle signal and having a vertical depth corresponding to a target range of acceptable pitch deviation in accordance with the upper and lower bounds of said given resolution advisory, said second indicia comprised of a pair of angularly disposed display lines of a second predetermined color and terminating at respective ends of said horizontal band, said first and second indicia defining an open-ended relatively trapezoidal symbol, said open end having a horizontal dimension exceeding the longitudinal dimension of the closed end defined by said horizontal bar, said open end downwardly disposed in response to a resolution advisory command to climb and upwardly disposed in response to a resolution advisory command to descend.

9. A system as set forth in claim 8, further comprising a third indicia substantially in the form of said second indicia symmetrically disposed with respect to said vertical axis and oppositely disposed with respect to the symbol defined by said first and second indicia, said first and second indicia being responsive to a resolution advisory with respect to a first threat aircraft and said third indicia responsive to a resolution advisory with respect to a second threat aircraft.

10. A system as set forth in claim 9, further comprising a fourth indicia responsive to said TCAS resolution advisory signal and superposed laterally of at least said first and second indicia on said display field of view and proximate to a numerical readout of current vertical speed, said fourth indicia comprising a vertical bar having a first sector of a first given color indicative of a commanded vertical speed and variable in vertical displacement with respect to a plurality of reference marks indicative of vertical speed, said vertical bar further comprising at least a second sector of a further given color, said second sector extending substantially from said first sector to a predetermined one of said plurality of reference marks indicative of vertical speed, said second sector disposed above or below said first sector in accordance with a proscribed vertical speed range defined by said resolution advisory signal.

11. A method for displaying a guidance resolution advisory in the form of pitch attitude command symbology superposed on an aircraft display instrument of the integrated primary flight display type, comprising:

providing a TCAS resolution advisory signal in the form of a vertical speed command for determining the evasive action to be taken by the pilot of a first aircraft to avoid collision with a second aircraft, providing signals corresponding to the aircraft roll angle and current pitch angle, providing signals corresponding to the current vertical speed and true airspeed, applying said TCAS signal, said current vertical speed signal, and said true airspeed signal to generate a signal corresponding to a first trigonometric function, deriving a second trigonometric function representative of aircraft roll angle and generating a corresponding signal thereof, combining said first and second trigonometric function signals to derive a further signal representative of a desired change in aircraft pitch angle, combining said current pitch angle signal and said desired change in pitch angle signal to provide a signal corresponding to a commanded pitch angle for avoiding said collision, and applying said commanded pitch angle signal to said display instrument to effect vertical displacement of a symbolic representation thereof for command purposes.

* * * * *